UNITED STATES PATENT OFFICE.

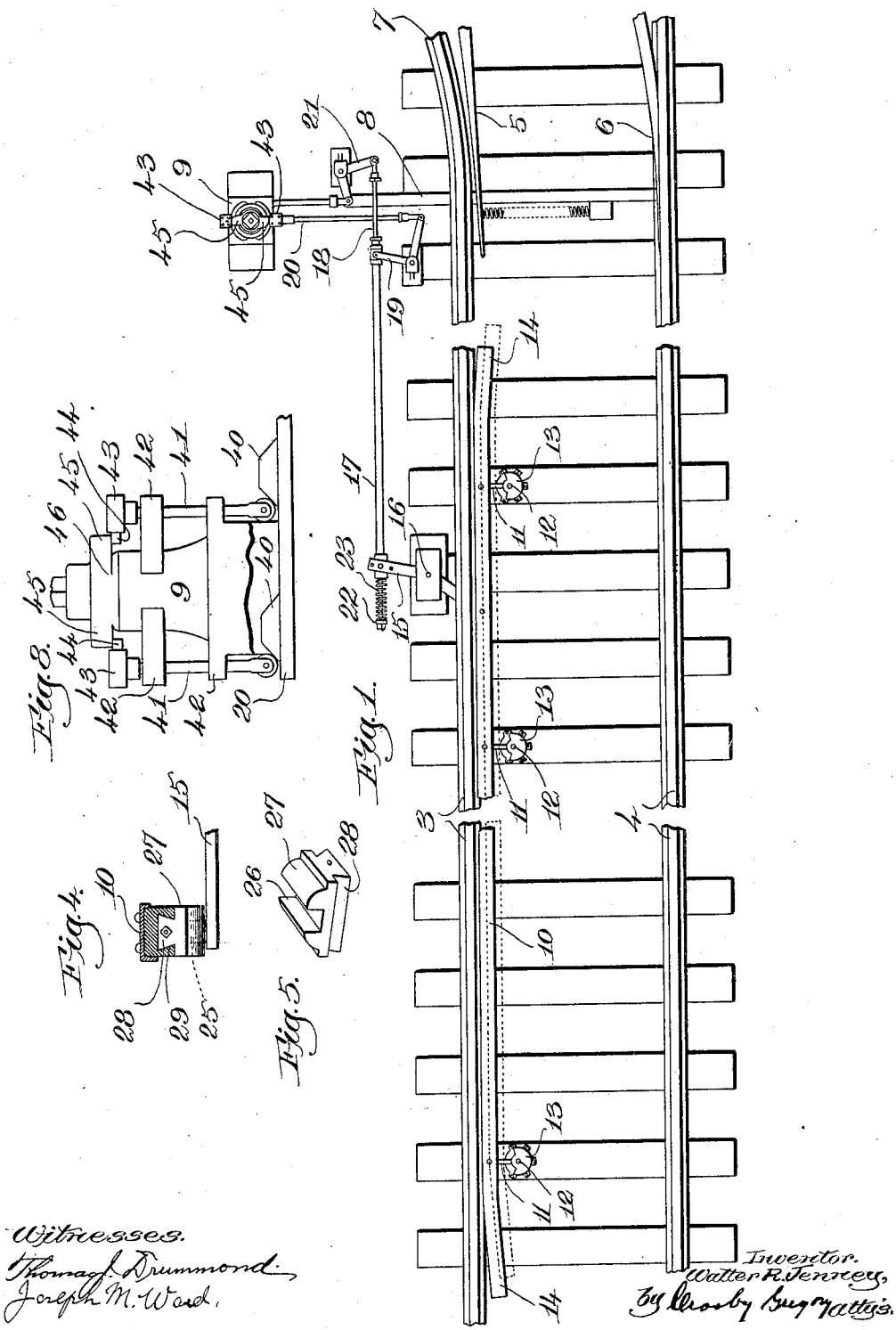

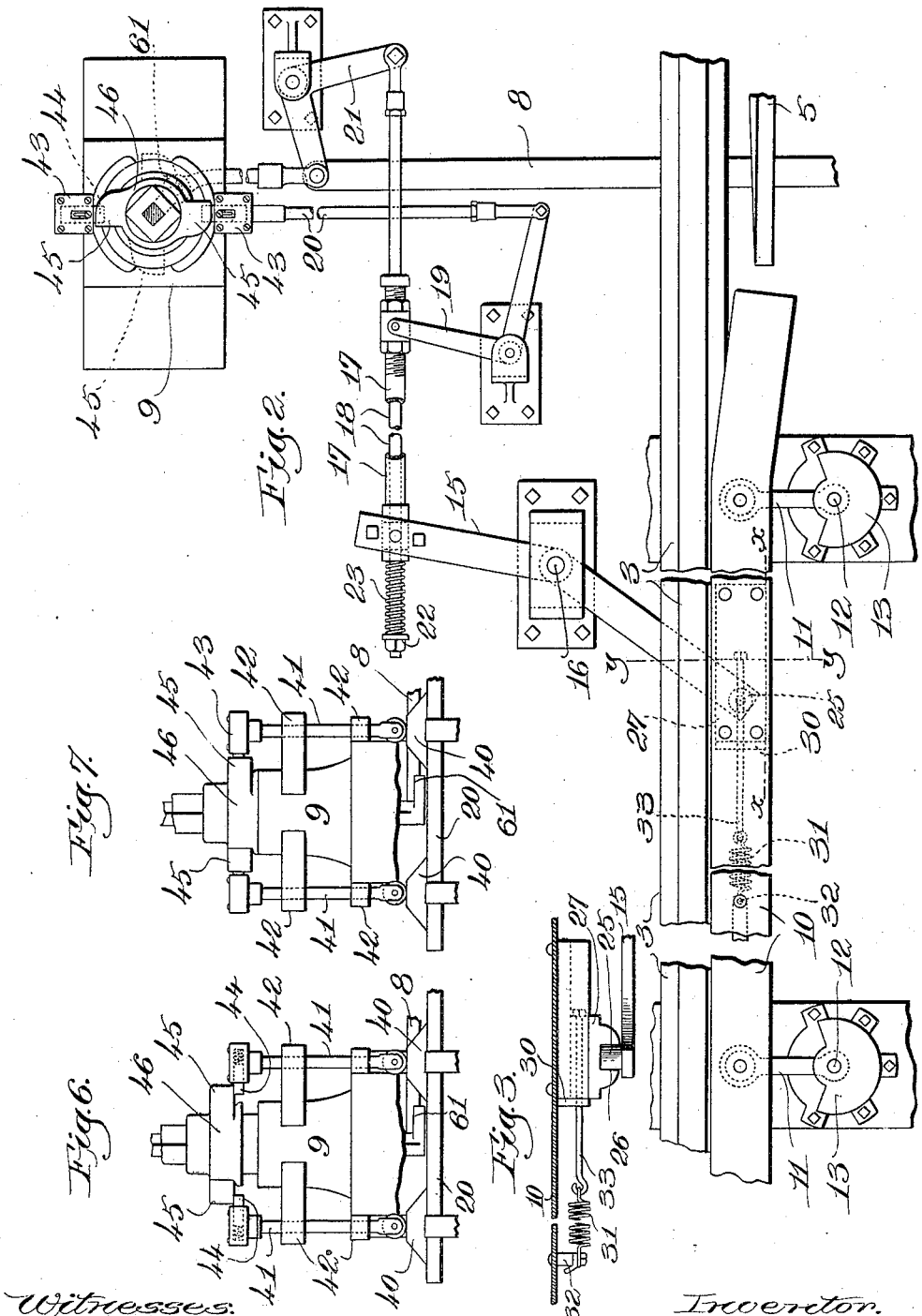

WALTER R. JENNEY, OF WESTFIELD, MASSACHUSETTS, ASSIGNOR TO JENNEY SAFETY SWITCH COMPANY, OF WESTFIELD, MASSACHUSETTS, A CORPORATION OF MASSACHUSETTS.

AUTOMATIC SWITCH.

No. 896,994.           Specification of Letters Patent.           Patented Aug. 25, 1908.

Application filed January 25, 1908. Serial No. 412,585.

*To all whom it may concern:*

Be it known that I, WALTER R. JENNEY, a citizen of the United States, and a resident of Westfield, in the county of Hampden and State of Massachusetts, have invented an Improvement in Automatic Switches, of which the following description, in connection with the accompanying drawing, is a specification, like letters on the drawing representing like parts.

This invention relates to automatic switches that are adapted to be operated automatically by the movement of a car or train along the track.

The invention is especially designed as an improvement on the switch shown and described in my former patent No. 853882, dated May 14, 1907.

In the device shown in said patent an actuator bar is employed which extends along one of the rails of the main track and which is mounted on parallel pivoted arms so that as the flanges of a car wheel are crowded between said actuator bar and the rail of the track said bar is swung away from the rail. Said device also comprises suitable connections between the actuator bar and the switch by means of which the switch is first unlocked and then shifted by the movement of the actuator. Said actuator bar, as shown in the patent, is mounted so that it can swing from its normal position toward the switch points only. As a result of this construction the said actuator bar will be moved in the direction in which the car is moving when the latter is traveling toward the switch points, but when said actuator bar is actuated by a car moving away from the switch points said bar moves in a direction opposite to that in which the car is moving.

One of the objects of my present invention is to improve the construction shown in the patent by making a device in which the actuator bar can move in both directions from its neutral or normal position so that whenever said actuator bar is moved by a car traveling over the track said actuator bar will swing in the direction in which the car is traveling.

The device shown in this application is especially designed for shifting a switch which is open to the siding by the movement of a car or train approaching the siding on the main track, and therefore it is necessary to have such connections between the actuator and the switch that the latter will be operated by the movement of a train toward the switch but will not be operated by the movement of the train away from the switch. Accordingly in my present invention I have provided a connection between the actuator bar and the switch by means of which said switch will be operated only when the actuator bar is moved by a train or car traveling toward the switch points, said connections permitting the actuator bar to be moved by a train traveling away from the switch points without affecting the position of the switch.

Another object of the invention is to improve generally the construction shown in said patent and the connections with the switch stand.

In the drawings wherein I have illustrated one embodiment of my invention:—Figure 1 is a plan view showing the lay out of my improved switch mechanism; Fig. 2 is an enlarged view of a portion of the actuator bar and the connections between the latter and the switch stand and switch; Fig. 3 is a section through the actuator bar on the line $x$—$x$, Fig. 2; Fig. 4 is a section on the line $y$—$y$, Fig. 2; Fig. 5 is a view of the sliding block which connects the pivoted lever to the actuator bar; Figs. 6 and 7 are fragmentary views of a switch stand showing the manner of operating it by means of my improved construction. Fig. 8 is a fragmentary view of a switch stand showing the parts in the normal position when the switch is open to the siding.

In the drawings 3 and 4 are the rails of the main track and 5 and 6 are the movable switch points by means of which the train is either diverted to the siding 7 or maintained on the main track. These parts are such as are usually found in switches and form no part of my present invention.

The switch points 5 and 6 are connected by a bar 8 which leads to the usual crank 61 of a switch stand 9 which may be of any suitable or usual construction. I have herein shown what is commonly known as the "Ramapo switch stand", which is an automatic switch stand that permits the train to trail out of the siding when the switch is closed thereto. Situated along parallel with the rail 3 of the main track is the actuator bar 10. This is pivotally mounted on the arms 11 which are pivoted at 12 to suitable stands 13.

The ends of the actuator bar are flared outwardly, as at 14, to permit the flange of a car wheel to enter between said bar and the rail 3. Normally the actuator bar stands closely adjacent to the rail 3 but as a train moves over the track it is swung away from the rail by the crowding of the flanges of the car wheel between said bar and the rail. The bar has pivoted thereto a lever 15 which is pivoted to a fixed support as at 16. This lever is pivotally connected to a sleeve 17 which encircles a rod 18. The sleeve is also pivotally connected to one arm of a bell crank 19, the other arm of which is pivoted to the sliding bar 20.

The bar 8 connecting the switch points 5 and 6 has connected thereto one arm of a bell crank 21, the other arm of which is pivoted to the rod 18 which extends through the sleeve 17. Said rod has on its end a collar 22 between which and the sleeve 17 is situated a spring 23. These parts just described are or may be all substantially as shown in my former patent.

When a car moves from the left to the right Fig. 1 toward the switch points, the flanges of the wheels thereof will swing the actuator bar 10 toward the right and away from the rail 3, and such movement will swing the lever 15. Since the switch points are normally locked the rod 18 can have no movement and the swinging movement of the lever 15 shifts the sleeve 17 to the left and compresses the spring 23. This movement of the sleeve 17 operates to unlock the switch stand, and as soon as the switch stand is unlocked the resiliency of the spring 23 serves to move the rod 18 to the left, Figs. 1 and 2, thereby shifting the switch points to close the siding. This is the manner in which the device illustrated in my patent operates.

One objection to the apparatus shown in said patent is that the actuator bar is so mounted that it must always move away from the main rail in a direction towards the switch points, and, therefore, when a train is moving out from the switch and engages the actuator bar, the movement of the actuator bar must be in a direction opposite to that of the train.

In the present invention I have mounted the actuator bar so that it can swing in both directions from the normal position shown in Fig. 1, and, therefore, said actuator bar will move with the train in whichever direction the latter is moving. Since it is only that movement of the actuator bar which is caused by a train moving toward the switch that is made use of for operating the switch I have in my present improvements provided such a connection between the lever 15 and the actuator bar that when said actuator bar is moved toward the switch by a train moving in the same direction the switch will be operated, while when said actuator is moved by a train traveling toward the left, Fig. 1, or away from said switch said switch will not be operated. This connection is best shown in Figs. 3, 4 and 5 from which it will be seen that the end of the lever 15 has a roll or projection 25 thereon that enters a groove 26 in a block 27 which is shown as having the dovetailed portion 28 that slides in the dovetailed ways 29 carried by the bar 10. Said bar has an abutment or shoulder 30 which is adapted to engage one end of the block 27 and said block is normally held against said abutment by means of a spring 31, one end of which is secured to a projection 32 extending from the bar 10 and the other end of which is connected to a rod 33 that is secured to the block 27.

When the actuator bar 10 is actuated by a train moving toward the right, Fig. 1, said bar will swing toward the right away from the rail 3, and by reason of the engagement of the abutment 30 with the block 27 said block is carried forward with the actuator bar and the lever 15 is therefore turned to actuate the switch. If, however, a train is moving toward the left, Figs. 1 and 2, the impact of the wheels of the train against the actuator bar 10 will swing the latter toward the left, and during such swinging movement the block 27 and lever 15 will remain substantially stationary, said block sliding in the ways 29 against the action of the springs 31. This construction affords such a yielding and sliding connection between the lever 15 and the actuator bar 10 that the movement of the actuator bar in one direction will actuate the switch while the movement in the opposite direction can be made without actuating the switch. While I have shown one particular construction adapted to accomplish this object I do not wish to be limited thereto.

The mechanism for unlocking the switch stand is slightly different in the present embodiment from what is shown in the said patent. As herein shown the sliding bar 20 is formed with two cams 40 which are adapted to coöperate with rolls on the lower end of lifter rods 41 which are mounted to slide vertically in suitable bearings 42 extending from the switch stand 9. Each lifter rod has at its upper end a head 43 within which is received a spring-pressed pin or finger 44.

The switch stand herein shown is of the type known as the "Ramapo switch stand". As this switch stand is well known I have not deemed it necessary to go into the details of its construction, but have thought it sufficient to refer to the fact that it comprises in its construction a head 46 which when elevated, as shown in Fig. 6, unlocks the switch rails so that they can be thrown. These switch stands are usually provided with a handle (not shown) by means of which the head 46 may be elevated when it is desired to throw the switch by hand. In adapting this switch stand for use in connection with my invention I provide the head with two cam lugs 45 which are situated so that when the switch is open to the siding, as shown in Figs. 1 and 2, said lugs stand in line with the heads 43. When the guard rail 10 is in its normal position against the main rail 3, as shown in the drawings, the sliding bar 20 is in the position shown in Fig. 8 with the cams 40 withdrawn from beneath the end thrust rods 41. When, however, the guard rail is swung toward the right away from the main rail the sliding bar 20 is moved toward the switch stand by the lever 15, sleeve 17, and bell crank 19, and the cams 40 are brought under the thrust rods 41. The fingers 44 are normally projected, as shown in Fig. 8, and as the thrust rods are elevated said fingers engage the cam projections 45 and raise the head 46 thereby unlocking the switch stand and permitting the compressed spring 23 to throw the switch points.

If the switch is set for the main line and it is desired to take the siding the switch stand has to be operated by hand in a manner similar to that described in my aforesaid patent, which is as follows:—The train is either brought to a standstill with the flanges of the car wheels between the actuator bar and the main rail and with said actuator bar crowded away from the main rail, or said train is moved slowly past the actuator bar. It should be noted in passing that the length of the actuator bar is greater than that of the longest wheel base of any of the cars passing over the track so that when the car moves over the track, the actuator bar will be maintained away from the switch rail as long as the train is passing over it. The swinging of the actuator bar away from the main rails by the car wheels operates the sliding bar 20 and elevates the thrust rods 41 by means of the cams 40, as above described. So long as the switch is closed to the siding and open to the main line the cam projections 45 on the switch stand are in the dotted line position Fig. 2 so that when the actuator bar 10 is moved while the switch is in this position said cam lugs are not engaged by the thrust rods as they are thrust upwardly. While the actuator bar is thus maintained in its position away from the main rail by the train, the switchman operates the switch stand by hand in the usual manner, and as the head 46 is turned thereby to throw the switch the cam faces of the cam lugs 45 engage the fingers 44 and force them inwardly as shown in Fig. 7. When the train has passed by the switch and the last wheel thereof has passed out of engagement with the actuator bar said bar is returned to its normal position and the sliding bar 20 is consequently withdrawn into the position shown in Fig. 8 thus carrying the fingers 44 below the lugs 45.

The switch is now in position to be again actuated automatically by a train approaching it, as above described, because the lugs 45 are situated directly over the fingers 44 and the head 46 will be lifted by the thrust rods when the latter are actuated by the sliding bar 20.

From the above it will be seen that my improvements do not interfere at all with the operation of the switch by hand.

While I have shown my invention as used in connection with a switch stand of the Ramapo type yet I desire to state that the invention can be equally well used with switch stands of other types.

Having fully described my invention what I claim as new and desire to secure by Letters Patent is:—

1. In a switch apparatus, the combination with a main track and a switch, of an actuator bar extending longitudinally of the track and adapted to be moved longitudinally by the movement of a car thereover, means between said actuator bar and the switch to throw the latter by movement of the actuator bar caused by a car moving towards the switch, said means permitting the actuator bar to be moved by the movement of a car away from the switch without operating the switch.

2. In a switch apparatus, the combination with a main track and movable switch points, of an actuator bar extending along one of the rails of the main track and mounted on pivoted arms and adapted to swing away from said rail in either direction, and connections between said actuator bar and the switch points to operate the latter by the swinging movement of the actuator bar in one direction only.

3. In a switch apparatus, the combination with a main track and movable switch points, of an actuator bar extending along one of the rails of the main track and mounted on pivoted arms and adapted to swing away from said rail in either direction, and connections between said actuator bar and the switch points to operate the latter by the swinging movement of the actuator bar toward the switch points only.

4. In a switch apparatus, the combination with a main track and movable switch points, of an actuator bar extending along one of the rails of the main track and adapted to be moved longitudinally of said rail by the movement of a car, a pivoted lever connected to said actuator bar to be actuated thereby when the actuator moves in one direction only, and connections between said lever and the switch points.

5. In a switch apparatus, the combination with a main track and movable switch points, of an actuator bar extending along one of the rails of the main track and adapted to be moved longitudinally of said rail by the movement of a car, a pivoted lever connected to said actuator bar to be actuated thereby when the actuator moves toward the switch points only, and connections between said lever and the switch points.

6. In a switch apparatus, the combination with a main track and movable switch points, an actuator bar extending longitudinally of one of the rails of the main track, a pivoted lever, connections between said lever and said switch points, a block pivotally connected to said lever and slidably carried by the actuator bar, and means to cause said block to move with the actuator bar when said actuator bar moves in one direction while permitting said actuator bar to move in the opposite direction without giving movement to said block.

7. In a switch apparatus, the combination with main rails and movable switch points, of a pivoted lever, connections between said lever and the switch points, and an actuator bar extending longitudinally of the main track and adapted to be operated by the movement of a bar thereover, said bar having an abutment, a block slidably sustained by said actuator bar and pivotally connected to said lever, and means to yieldingly hold said block against said abutment.

8. In a switch apparatus, the combination with a main track and movable switch points, of a switch stand connected to said switch points and comprising a vertically-movable locking head having cam projections, thrust rods to engage said projections, a sliding bar having cams to actuate the thrust rods, an actuator bar extending longitudinally of the track and adapted to be actuated by the movement of a car thereover, and connections between said bar and said sliding bar.

9. In a switch stand, the combination with a main track and movable switch points, of a switch stand comprising a shaft connected to the switch points, a vertically movable head mounted on said shaft to turn therewith and having cam projections, vertically movable thrust rods to engage said projections thereby to elevate the head and unlock the switch, an actuator bar extending longitudinally of the track and adapted to be moved by the movement of a car thereover, and means to elevate the thrust rods by the movement of the actuator bar.

In testimony whereof, I have signed my name to this specification, in the presence of two subscribing witnesses.

WALTER R. JENNEY.

Witnesses:
   Louis C. Smith,
   Margaret A. Dunn.